No. 684,550. Patented Oct. 15, 1901.
C. A. PETTIE.
PNEUMATIC TIRE FOR VEHICLES.
(Application filed Dec. 20, 1900.)

(No Model.)

Witnesses,
C. W. Benjamin

Inventor,
Charles A. Pettie
by W. P. Preble Jr.
his atty

THE NORRIS PETERS CO., PHOTO-LITHO., WASHINGTON, D. C.

UNITED STATES PATENT OFFICE.

CHARLES A. PETTIE, OF BROOKLYN, NEW YORK.

PNEUMATIC TIRE FOR VEHICLES.

SPECIFICATION forming part of Letters Patent No. 684,550, dated October 15, 1901.

Application filed December 20, 1900. Serial No. 40,541. (No model.)

*To all whom it may concern:*

Be it known that I, CHARLES A. PETTIE, a citizen of the United States, and a resident of Brooklyn borough, New York city, in the State of New York, have invented certain new and useful Improvements in Pneumatic Tires for Vehicles and Bicycles, of which the following is a specification.

The object of my invention is to provide vehicles of various characters—such as wagons, carriages, automobiles, and bicycles—with a pneumatic tire which by virtue of its peculiar construction is not only practically puncture-proof, but is protected against injury when the vehicle has to be used with a deflated tire by reason of leakage or accident to the inner tube or valve. In this way the rider is enabled to reach home after a deflating accident without injury to the tires, which upon reinflation are restored to their original condition, as good as ever. This object is accomplished partly by giving such a shape to the edges or periphery of the tire that even when deflated it presents an angular instead of flat surface to the ground, but more particularly by providing a separable buffer, preferably of laminated wood covered with felt, running circumferentially around the wheel inside the inner tube, so that the tread-surface of the tire comes against and is supported by said buffer whenever the tire becomes deflated, and thus becomes a practicable cushion-tire which may be ridden on indefinitely without injury.

The tire consists of an outer jacket bent around to present the appearance of a tubular tire and made, preferably, of rubber coated and lined duck, a strip of laminated wood set between the meeting ends of the jacket, and thus completing the outer tube, means for drawing the ends of the jacket against the strip with sufficient force to hold the tire firmly in place on the wheel, an inflatable inner tube, and a separable buffer inserted longitudinally in said inner tube.

One form of my improved tire is shown in the accompanying drawings, in which—

Figure 1:
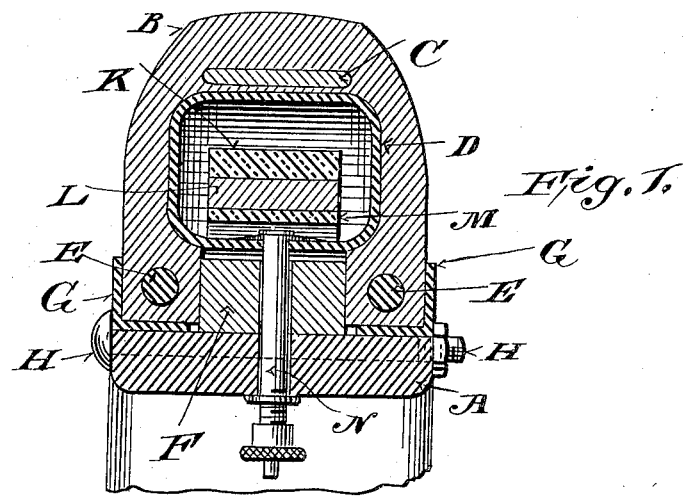
Figure 2:
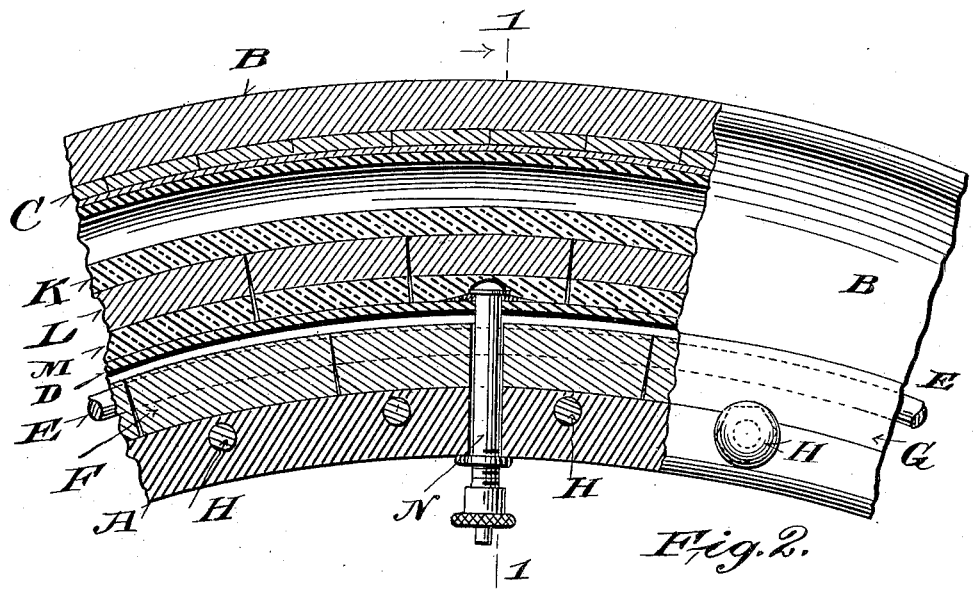

Figure 1 is a cross-section on line 1 1 of Fig. 2. Fig. 2 is a side view of a portion of the tire, partly in elevation and partly in section.

Same letters indicate similar parts in both figures.

A is the wooden rim of the wheel.

B is the jacket or outer tube, of rubber-coated fabric, preferably duck, and in which is inserted a strip of laminated wood C, by means of which the tread-surface is rendered puncture-proof.

D is the inner tube, made of rubber and inflatable by means of the usual valve M.

The jacket is secured in position around the inner tube as follows: Each end of the rubber-coated fabric forming the jacket surrounds a hoop E E, of iron or other strong material, which hoops run circumferentially around the wheel, one near each edge of the wooden rim.

F represents a strip of wooden blocks extending around the rim between the strengthened ends of the jacket and against which said ends are pressed by the angle-irons G under the action of the bolt H. The angle-irons are simply set on the wheel-rim, so that they are easily put in place and removed when not under pressure from the bolts H, set in the wheel-rim sufficiently near the circumference to have the bolt-head and nut clasp the irons and draw them together. The buffer extends, as before stated, lengthwise through the inner tube, which makes it circumferential with the wheel-rim when the tube is placed thereon, and may be composed of any light and durable material adapted to the weight of the vehicle to which it is to be applied. I have found the best way of making the buffer is to use a continuous strip of felt K, upon the under side of which are secured by cement or otherwise a succession of wooden blocks L, laminated to enable them to conform to the curvature of the wheel, each of which is covered on its under surface with a piece of felt M. The buffer of course serves no function when the tire is inflated, but becomes a complete safeguard to the main jacket or tire whenever the inner tube becomes deflated by reason of the fact that it offers a continuous soft but durable and resisting surface, against which the tread portion of the jacket can press without any tendency to creep or tear when an emergency requires that the vehicle should be driven with deflated tires.

Among the many advantages of this improved tire may be mentioned the fact that in addition to being puncture-proof and capable of resisting long use in a deflated condition the tire is very inexpensive and is very readily applied and removed from the wheel. The inexpensiveness arises from the fact that all the parts of which the tire is composed can be made by machinery and do not require hand labor, while they can be readily applied and removed, owing to the fact that no part requires to be cemented to the wheel-rim, the pressure exerted by the bolts being all that is required to hold the tire firmly in place.

I claim—

The above-described pneumatic tire which consists of a jacket of flexible material, the edges of which are strengthened by hoops adapted to run circumferentially around the wheel, a strip of resisting material adapted to run circumferentially around the wheel between the strengthened edges of the jacket and means substantially as described whereby the edges of the jacket are forced against said strip to form the outer tube of the tire; an inflatable inner tube and a separable buffer adapted to extend circumferentially around the wheel inside said inner tube substantially as and for the purposes set forth.

CHARLES A. PETTIE.

Witnesses:
W. P. PREBLE, Jr.,
RAE BATTERSBY.